(12) United States Patent
Rodriguez-Amaya et al.

(10) Patent No.: US 9,206,779 B2
(45) Date of Patent: Dec. 8, 2015

(54) INJECTION DEVICE

(75) Inventors: Nestor Rodriguez-Amaya, Stuttgart (DE); Jochen Doehring, Stuttgart-Stammheim (DE); Juergen Hanneke, Stuttgart (DE); Godehard Nentwig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 139 days.

(21) Appl. No.: 13/812,198

(22) PCT Filed: Jul. 18, 2011

(86) PCT No.: PCT/EP2011/062253
§ 371 (c)(1),
(2), (4) Date: Jan. 25, 2013

(87) PCT Pub. No.: WO2012/019873
PCT Pub. Date: Feb. 16, 2012

(65) Prior Publication Data
US 2013/0119161 A1    May 16, 2013

(30) Foreign Application Priority Data
Aug. 9, 2010  (DE) .......................... 10 2010 039 048

(51) Int. Cl.
*F02M 59/00* (2006.01)
*F02M 47/06* (2006.01)
*F01N 3/20* (2006.01)
(Continued)

(52) U.S. Cl.
CPC ............. *F02M 47/06* (2013.01); *F01N 3/2066* (2013.01); *F01N 2610/1453* (2013.01); *F02M 47/025* (2013.01); *F02M 57/027* (2013.01); *F02M 63/0028* (2013.01); *Y02T 10/24* (2013.01)

(58) Field of Classification Search
USPC ....................................................... 239/533.2
See application file for complete search history.

(56) References Cited

U.S. PATENT DOCUMENTS 7,891,584 B2 * 2/2011 Ganser ........................ 239/533.9
8,522,530 B2 * 9/2013 Igarashi et al. ................. 60/277
(Continued)

FOREIGN PATENT DOCUMENTS

DE    102007027667    12/2008

OTHER PUBLICATIONS

International Search Report for Application No. PCT/EP2011/062253 dated Oct. 11, 2011 (English Translation and Original, 4 pages).

*Primary Examiner* — Len Tran
*Assistant Examiner* — Adam J Rogers
(74) *Attorney, Agent, or Firm* — Michael Best & Friedrich LLP

(57) ABSTRACT

The invention relates to an injection device, in particular for injecting fluid into an exhaust tract of an internal combustion engine, having a valve unit which comprises a valve needle, an injection chamber having at least one injection opening, and a control chamber, wherein the injection device is designed so that a pressure differential between the injection chamber and the control chamber brings about a displacement of the valve needle between an open position in which the valve needle releases a fluid flow through the injection opening, and a closed position in which the valve needle closes off the injection opening. The injection device also has a pump unit integrated in the injection device. The pump unit is designed so as to draw in fluid from the fluid inlet during operation and to provide said fluid to the valve unit under increased pressure.

10 Claims, 3 Drawing Sheets

(51) Int. Cl.
*F02M 47/02* (2006.01)
*F02M 57/02* (2006.01)
*F02M 63/00* (2006.01)

(56) References Cited

U.S. PATENT DOCUMENTS

2003/0019956 A1* 1/2003 Rodriguez-Amaya .... 239/533.2
2003/0172910 A1 9/2003 Mattes et al.
2003/0222158 A1* 12/2003 Boehland et al. .......... 239/533.2
2004/0026645 A1* 2/2004 Hanneke et al. ......... 251/129.19
2005/0274828 A1* 12/2005 Kurz et al. ................. 239/533.2
2006/0054138 A1* 3/2006 Geyer ........................... 123/446
2007/0295003 A1* 12/2007 Dingle et al. ................... 60/301
2008/0014103 A1 1/2008 Cooke
2009/0151700 A1* 6/2009 Kondoh ........................ 123/457
2011/0168812 A1* 7/2011 Frasch et al. ............... 239/533.3

* cited by examiner

INJECTION DEVICE

BACKGROUND OF THE INVENTION

The invention relates to an injection device for fluid, in particular to an injection device for injecting fluid into an exhaust tract of an internal combustion engine.

The demands on the exhaust-gas quality of internal combustion engines, in particular of internal combustion engines for driving motor vehicles, have become ever higher in recent years. In the case of diesel engines in particular, $NO_x$ emissions constitute a problem, which is counteracted by means of so-called SCR catalytic converters. In an SCR catalytic converter, environmentally harmful $NO_x$ is converted into $N_2$ and $H_2O$ by means of $NH_3$, which is supplied to the catalytic converter generally in the form of an aqueous urea solution.

In order to supply the urea solution to the exhaust gases of the internal combustion engine, a dosing system is required which conventionally comprises an electrically operated pump and an electrically activated dosing valve. Such known dosing systems are complex and expensive in terms of manufacture, assembly and maintenance.

EP 1 878 920 A1 discloses a liquid pump having an inlet, an outlet, a pump chamber for receiving the liquid, and an actuator which is movable between a first position and a second position and which is designed to pump liquid out of the pump chamber and into the outlet. The inlet and the outlet are fluidically connected to a supply passage when the actuator is in the first position. The supply passage runs around the actuator in order to permit a transfer of heat from the actuator to the liquid.

US 2007/0295003 A1 describes a high-pressure dosing pump which is intended for providing a reducing agent to an exhaust-gas reduction system. The high-pressure dosing pump has an electromagnet for driving a piston which is movably mounted in an inner bore of a valve housing of the pump. The inner bore has a pressure chamber with a one-way inlet valve and a one-way outlet valve. Movement of the piston causes reducing agent at high pressure to be supplied to an injection nozzle. The injection nozzle is arranged at a location which permits a maximum reduction of undesired pollutants in the exhaust gases.

SUMMARY OF THE INVENTION

It is an object of the invention to provide an improved dosing system which permits an effective injection of fluid and which is inexpensive to manufacture, assemble and maintain.

The object is achieved by means of an injection device according to the invention for a dosing system, as claimed in independent patent claim 1. The dependent patent claims describe advantageous embodiments of an injection device according to the invention.

An injection device according to the invention which is designed in particular for injecting fluid into an exhaust tract of an internal combustion engine comprises a valve unit which has a valve needle (nozzle needle), a control chamber and an injection chamber with at least one injection opening. The injection device is designed such that the valve needle can be moved between an open position, in which the valve needle permits a fluid flow through the injection opening, and a closed position, in which the valve needle closes the injection opening, by a pressure difference between the injection chamber and the control chamber.

There is additionally integrated into the injection device a pump unit which is designed to suck fluid out of a fluid supply and discharge said fluid at elevated pressure, that is to say at a pressure higher than the pressure in the fluid supply, to the valve unit. When the valve unit is open, fluid is thus discharged out of the injection device at a pressure higher than the pressure in the fluid supply.

In one embodiment, the valve unit and the pump unit are arranged in a common housing. This permits a particularly compact construction of the injection device. The line paths between the pressure-generating pump unit and the valve unit in which the fluid is under elevated pressure during operation are shorter than in a conventional construction with an external pump unit, and run entirely within the injection device. The risk of an uncontrolled escape of fluid from the injection device (leakage) is reduced, and the hydraulic stability of the system is improved.

An injection unit according to the invention permits a fast release of pressure from the valve needle during the opening process, such that short switching times and a broad range of possible injection quantities can be realized.

A reduced structural size of the injection device permits a high degree of variability during assembly, for example on an exhaust tract, and increases the freedom for the configuration of the fluid tank; in particular, a reduced structural size of the injection device makes it possible to enlarge the usable volume of the fluid tank.

The required injection pressure is, according to the invention, generated in the injection device itself. A (high-pressure) feed line in which the fluid is at elevated pressure and which must therefore be of particularly stable form, and which is nevertheless susceptible to failure and leakage, can be dispensed with. This increases the operational reliability of the injection system.

An injection device according to the invention has a low voltage and power requirement during operation, and permits a standardized design for multiple applications.

In one embodiment, the valve unit has a control chamber which is delimited by an end of the valve needle, wherein the volume of the control chamber can be varied by movement of the valve needle, or the valve needle can be moved by variation of the pressure in the control chamber. Such an arrangement makes it possible for the valve needle to be actuated by variation of the fluid pressure in the control chamber. It is possible to dispense with a mechanical actuator for activating the valve needle. This simplifies the construction of the injection device, and in particular of the valve unit.

In one embodiment, the control chamber is hydraulically connected to a supply line through which fluid can be supplied to the injection device during operation. The same pressure thus prevails in the control chamber as in the supply line, and the valve needle is pushed by the fluid pressure in the control chamber into a closed position in which it prevents a fluid flow out of the injection device. During operation, the valve unit is reliably closed by the fluid pressure, without the need for an additional actuator.

In one embodiment, the pump unit has a piston chamber and a piston which is movable within the piston chamber. Here, the piston is arranged and designed such that the volume of the piston chamber and the pressure in the piston chamber can be varied by movement of the piston. As a result of such a combination of a piston chamber and a movable piston, a reliable and effective pump unit is provided which is suitable for increasing the pressure of the fluid to be injected.

In one embodiment, the piston chamber is hydraulically connected to the fluid supply by a one-way valve which is formed for example as a non-return ball valve. The one-way valve prevents fluid from flowing out of the piston chamber back into the supply line, and the elevated pressure built up by movement of the piston in the piston chamber thereby being dissipated as a result of a fluid flow out of the piston chamber into the supply line.

In one embodiment, the piston and the valve needle are movable along a common axis. An injection device in which the piston and the valve needle are movable along a common axis can be of particularly simple, space-saving and inexpensive construction. In particular, such an injection device can be constructed in the longitudinal direction of a cylindrical housing, wherein the piston and the valve needle are of cylindrical form and are movable parallel to the axis of the cylinder. A cylindrical injection device of said type is particularly durable and is simple and inexpensive to manufacture.

In one embodiment, the piston can be moved by energization of an electromagnet arranged in the injection device. An electromagnet provides a simple, inexpensive and reliable actuator for moving the piston. The actuator may alternatively be formed as a piezo actuator.

In one embodiment, the piston is supported by an elastic piston-spring element which pushes the piston in the direction of an initial position. An elastic piston-spring element of said type makes it possible to ensure that, when the electromagnet is deactivated, the piston is moved reliably into an initial position.

In one embodiment, the valve needle is supported on a housing of the injection device by an elastic valve needle spring element in such a way that, when the electromagnet is deactivated, that is to say deenergized, the elastic spring element forces the valve needle into the closed position, and the valve unit is reliably closed when the electromagnet is deactivated.

BRIEF DESCRIPTION OF THE DRAWINGS

The invention will be explained in more detail below on the basis of the appended figures, in which.

DETAILED DESCRIPTION

In the following description of the figures, statements such as "top" and "bottom" are used for better explanation of the exemplary embodiments of the invention shown in the figures, without restricting the invention to the exemplary embodiments shown or to a particular orientation and/or installation position.

Figure 1:
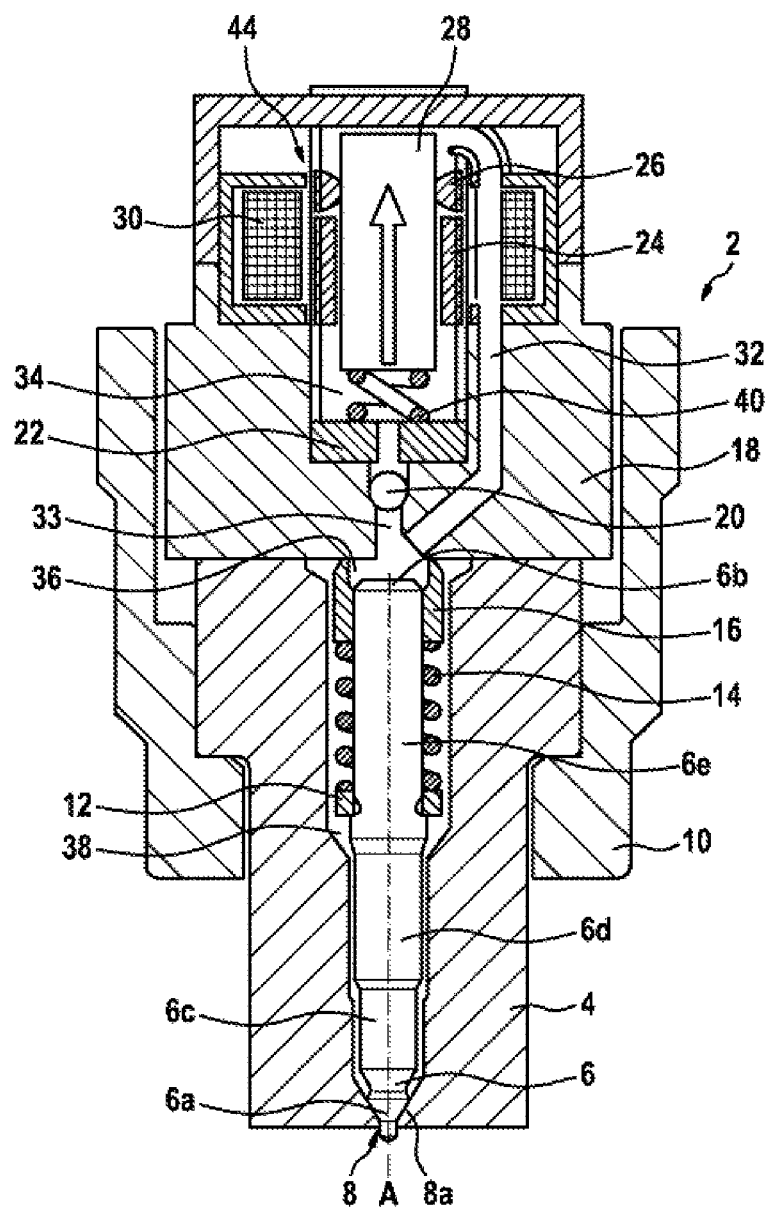
FIG. 1 shows a first sectional view of an exemplary embodiment of an injection device according to the invention during the suction process.

FIG. 1 shows a first sectional view of an injection device 2 according to the invention during a suction process.

An injection device 2 according to the invention has a for example cylindrical nozzle body 4, along the longitudinal axis A of which there is formed a for example substantially cylindrically shaped injection chamber 38. At that face end of the injection chamber 38 which is illustrated at the bottom in FIG. 1 there is formed an injection opening 8 through which fluid emerges from the injection chamber 38 during an injection process. A lower region, which adjoins the injection opening 8, of the injection chamber 38 has a smaller cross section in a plane perpendicular to the longitudinal axis A of the nozzle body 4 than an upper region, which is at a greater distance from the injection opening 8, of the injection chamber 38.

In the injection chamber 38 there is arranged a substantially cylindrical valve needle 6, the longitudinal axis of which is aligned along the longitudinal axis A of the nozzle body 4. The valve needle 6 is of stepped form with a conical lower region 6a and a plurality of cylindrical regions 6b, 6c, 6d, 6e, wherein the cylindrical regions 6b, 6c, 6d, 6e have, in a plane perpendicular to the longitudinal axis A of the valve needle 6, a cross section which is larger the greater the distance thereof from the lower, conical region 6a.

The valve needle 6 is movable along its longitudinal axis A between a closed position, in which the lower end 6a of the valve needle 6 rests on the valve seat 8a and closes off the injection opening 8 in a substantially fluid-tight manner, and an open position, in which the valve needle 6 opens up the injection opening 8.

Around the circumference of an upper region, which is remote from the injection opening 8, of the valve needle 6 there is arranged a cylindrical control chamber sleeve 16. Within the control chamber sleeve 16 there is formed, above the upper face end 6b of the valve needle 6, a control chamber 36 whose volume can be varied by movement of the valve needle 6 in a direction parallel to the longitudinal axis A thereof. Conversely, the valve needle 6 can be moved parallel to its longitudinal axis A by variation of the difference between the pressure in the injection chamber 38 and the pressure in the control chamber 36.

The control chamber 36 is delimited on the upper side, which is remote from the valve needle 6, by a control plate 18. The control plate 18 is fixed to the nozzle body 4 by securing pins (poka-yoke pins) 46 (not visible in FIG. 1) and by a nozzle clamping nut 10 which surrounds the nozzle body 4 and the control plate 18.

In a central region 6e of the valve needle 6 as viewed in the longitudinal direction, a support ring 12 is formed around the circumference of the valve needle 6. Between the support ring 12 and the control chamber sleeve 16, a cylindrical valve needle spring element 14 is arranged around the circumference of the valve needle 6, which valve needle spring element is supported with its two faces at one side on the control chamber sleeve 16 and at the other side on the support ring 12. The valve needle spring element 14 pushes the valve needle 6 elastically into the lower closed position, in which the valve needle 6 closes off the injection opening 8 in a substantially fluid-tight manner.

In the control plate 18 there is formed a fluid duct 33 with a one-way valve 20 designed for example as a ball valve or non-return valve. When the one-way valve 20 is open, the control chamber 36 is hydraulically connected via the fluid duct 33 to a piston chamber 34 which is formed above the one-way valve 20 in the control plate 18.

The volume of the piston chamber 34 is delimited, on a side facing away from the one-way valve 20, by a movable piston 28 which is arranged above the piston chamber 34 and which is supported elastically on the control plate 18 by a piston spring element 40. The volume of the piston chamber 34 can be varied by movement of the piston 28 in a direction parallel to the longitudinal axis A.

A setting disk 22 is arranged between a lower face end, which faces toward the valve needle 6, of the elastic piston spring element 40 and the control plate 18. The stroke of the piston 28 can be set through selection of the thickness of the setting disk 22.

Around the circumference of the piston 28 there are formed a metallic inner pole 24 and a coil 30, which together form an electromagnet which is suitable for moving the piston 28. At an upper region of the piston 28 remote from the control plate 18, an armature 26 is formed around the circumference of the piston 28. The armature 26 is magnetically attracted by the inner pole 24 when an electrical current flows through the coil 30.

During a suction process ("suction stroke") as shown in FIG. 1, with the coil 30 deactivated, that is to say when no electrical current flows through the coil 30, the piston 28 moves away from the control plate 18 parallel to the longitudinal axis A under the action of the force exerted by the elastic piston spring element 40, such that the spacing between the piston 28 and the control plate 18 increases. The volume of the piston chamber 34 is increased and fluid from the supply 32 flows through the control chamber 36, the fluid duct 33 and the open one-way valve 20 into the piston chamber 34.

As a result of interaction of the fluid pressure in the control chamber 36 connected to the supply 32 and the elastic force of the valve needle spring element 14, the valve needle 6 is forced into the lower closed position, in which the lower end 6a of the valve needle 6 closes the injection opening 8 in a fluid-tight manner and no fluid can flow out of the injection chamber 38 through the injection opening 8.

Figure 2:
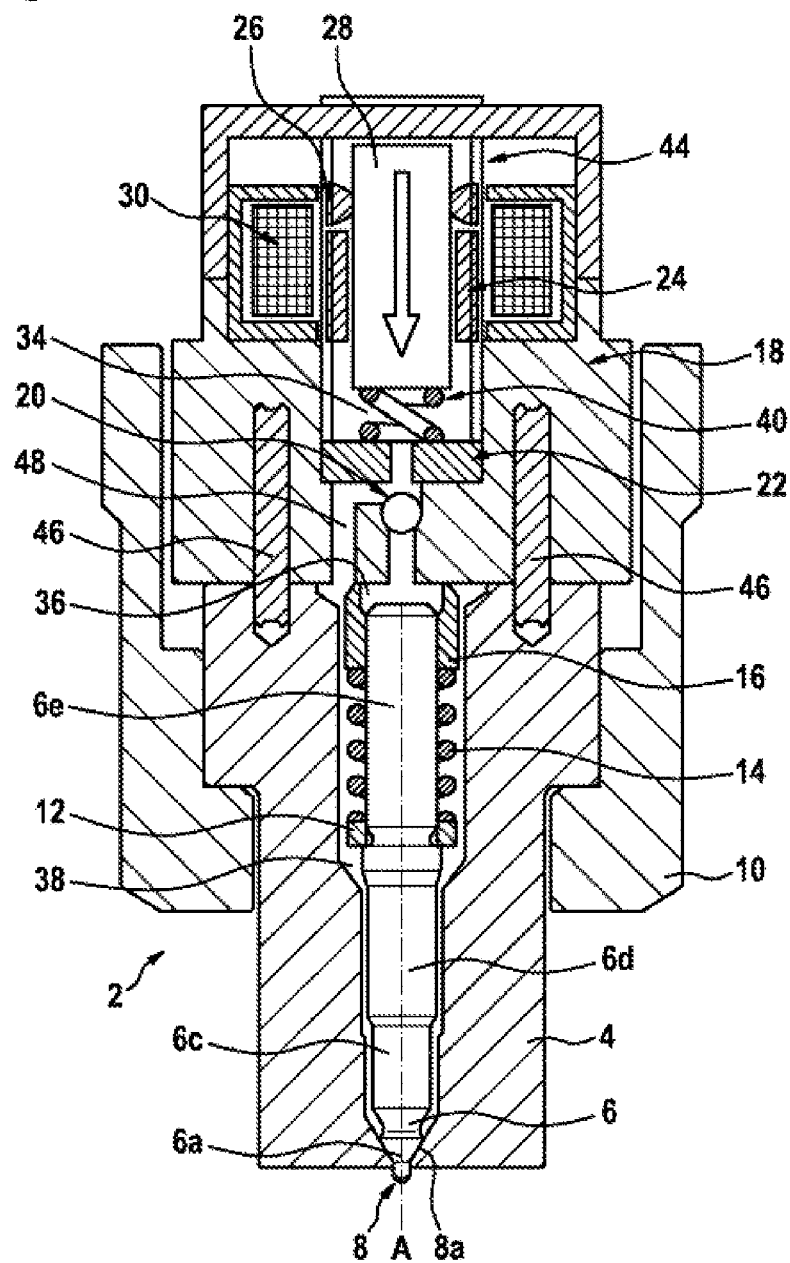
FIG. 2 shows a second sectional view of the injection device according to the invention during an injection process.

FIG. 2 shows a section through the injection device 2 according to the invention, as shown in FIG. 1, in a plane rotated through 90° about the longitudinal axis A of the injection device 2.

The components already shown in FIG. 1 are denoted by the same reference numerals, and will not be described in detail again.

In the second section plane shown in FIG. 2, the supply 32 is not visible. Instead, in this plane, it is possible to see a connecting duct 48 which is formed in the control plate 18 and which hydraulically connects the piston chamber 34 to the injection chamber 38. The connecting duct 48 is formed such that a fluid flow between the piston chamber 34 and the injection chamber 38 is possible regardless of whether the one-way valve 20 is open or closed.

The securing pins 46 already mentioned in conjunction with FIG. 1, by means of which the control plate 18 is fixed to the nozzle body 4, can also be seen in FIG. 2.

To initiate an injection process, an electrical voltage is applied to the coil 30 such that an electrical current flows through the coil 30. The armature 26 is attracted in the direction of the inner pole 24 by the magnetic field generated by the current flow in the coil, and the piston 28 which is connected to the armature 26 moves in the direction of the control plate 18 ("pressure or injection stroke").

As a result of the movement of the piston 28 in the direction of the control plate 18, the volume of the piston chamber 34 is reduced, and the fluid pressure in the piston chamber 34 is increased. The one-way valve 20 closes and prevents a return of fluid from the piston chamber 34 into the supply 32. Fluid flows out of the piston chamber 34 into the injection chamber 38 through the connecting duct 48 and also increases the fluid pressure in said injection chamber.

When a certain critical value of the fluid pressure in the injection chamber 38 is exceeded, the fluid pressure in the control chamber 36 and the force of the valve needle spring element 14 are no longer sufficient to hold the valve needle 6 in the closed position counter to the pressure of the fluid which has flowed into the injection chamber 38, which fluid acts on the regions 6a, 6c, 6d, 6e of the valve needle 6 and in particular exerts a force, which is directed toward the control chamber 36, on the transitions between the regions 6a, 6c, 6d and 6e. The valve needle 6 moves from the closed position into an open position counter to the fluid pressure in the control chamber 36, and the lower region 6a of the valve needle 6 moves away from the valve seat 8a and opens up the injection opening 8.

Fluid which is displaced out of the control chamber 36 by the opening movement of the valve needle 6 flows back into the supply 32, such that the fluid pressure in the control chamber 36 does not increase significantly. As a result, the valve needle 6 rises out of its seat 8a, and opens up the injection opening 8, particularly quickly.

Fluid at elevated pressure flows out of the injection chamber 38 through the open injection opening 8 (injection process) until the fluid pressure in the injection chamber 38 has fallen to such an extent that it is no longer capable of holding the valve needle 6 in an open position counter to the combination of the fluid pressure in the control chamber 36 and the force of the valve needle spring element 14. The valve needle 6 moves back into the lower, closed position again under the action of the fluid pressure in the control chamber 36 and the force of the valve needle spring element 14, in which lower, closed position the lower end 6a of the valve needle 6 is pressed against the valve seat 8a and closes off the injection opening 8.

By deactivation of the current flow through the coil 30, the electromagnet is deactivated and the piston 28 moves back, under the influence of the piston spring element 40, in a direction in which the distance from the piston 28 to the control plate 18 and the volume of the piston chamber 34 increase ("suction stroke", see FIG. 1). The one-way valve 20 opens and fluid flows out of the supply 32 into the piston chamber 34.

By application of an electrical voltage to the coil 30 again, a further injection process as has been described above can now be initiated.

Figure 3:
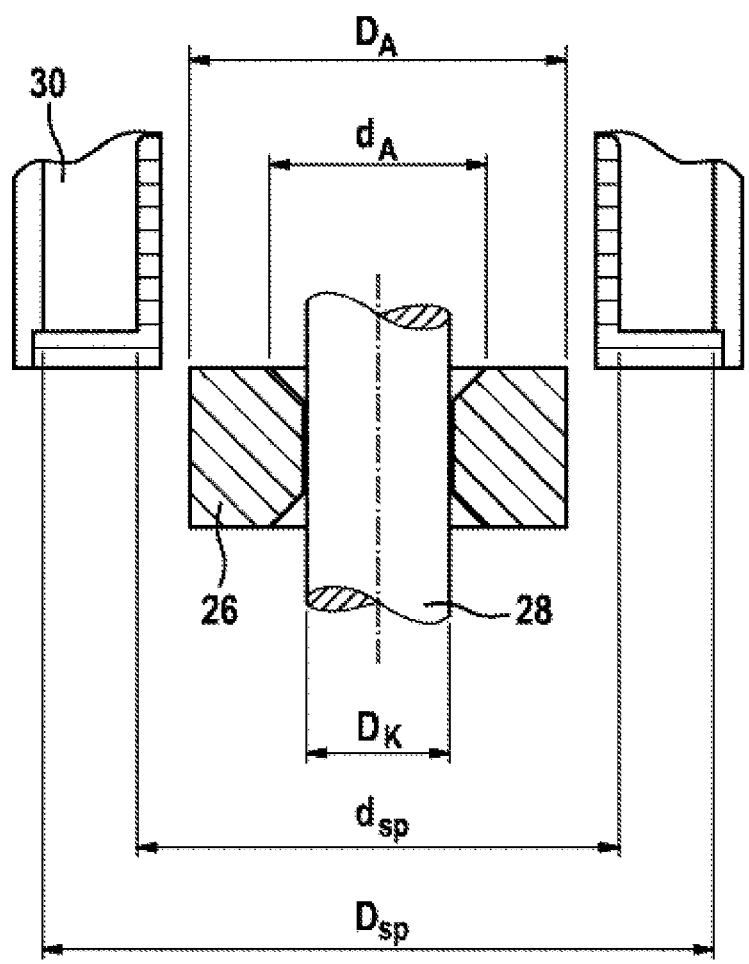
FIG. 3 shows an enlarged schematic detail of an injection device according to the invention; in particular an upper region of the piston with an armature and a surrounding electromagnet.

Below, possible dimensions of the pressure unit and in particular of the coil 30 of the electromagnet in order to generate a predefined injection pressure will be described, by way of an example, with reference to FIG. 3:

In the case of a pressure of 7 bar in the fluid supply 32, it is sought for example to generate an injection pressure of 9.5 bar, such that an additional pressure of 2.5 bar must be generated by the pressure unit.

For an assumed diameter $D_K$ of the piston 28 of 9 mm, that is to say a size of the circular face A of the piston of $A_K=19.63$ mm$^2$, a force to be exerted on the piston 28 can be calculated as $$F_K = \Delta p * A_K = 2.5 \text{ bar} * 19.63 \text{ mm}^2 = 4.9 \text{ N:}$$

Said force F is to be imparted as a magnetic force which is exerted on the armature 26 by the coil 28:

$$Fm = B^2 * AA/8\pi.$$

For an assumed magnetic field strength of B=1.8 T generated by the coil 28, the required area of the armature $A_A$ can be calculated as:

$$A_A = 8\pi * F_m / B^2 \approx 4.5 \text{ mm}^2.$$

Assuming that the effective area of the armature 26 pressed onto the piston 28 has an inner diameter of $d_A=7$ mm, a required outer diameter $D_A$ of the armature 26 can be calculated as:

$$DA2 = AA/4\pi + dA2$$

$$D_A \approx 7.5 \text{ mm}.$$

For an assumed magnetomotive force θ of 150 Aw and an assumed maximum current through the coil 28 of $i_{max}=2.2$ A, the number of windings of the coil 28 can be calculated as $$N = \theta / i_{max} \approx 68.$$

If a wire with a diameter $d_D$ of 0.45 mm is used for the coil 28 and the coil 28 is wound in 6 layers each with approximately 12 windings, then for an inner diameter $d_{Sp}$ of the coil 28 of approx. 5.5 mm, the resulting wire length is approximately 2.5 mm.

A wire conventionally used for such coils has, at this length, and at a temperature of 20° C., an electrical resistance of approximately 5.5Ω. For a supply voltage of 16 V, it can thus be calculated that a current i of $i = U/R \approx 2.9$ A must flow through the coil 30 in order to generate the desired injection pressure of 9.5 bar.

The invention claimed is:

1. An injection device (2) having a valve unit which has a valve needle (6), and injection chamber (38) with at least one injection opening (8), and a control chamber (36), wherein the injection device (2) is designed such that a pressure difference between the injection chamber (38) and the control chamber (36) causes a movement of the valve needle (6) between an open position, in which the valve needle (6) permits a fluid flow through the injection opening (8), and a closed position, in which the valve needle (6) closes the injection opening (8), and having a pump unit which is integrated into the injection device (2) and which is designed to suck fluid out of a fluid supply (32) and supply said fluid at elevated pressure to the valve unit, wherein the pump unit has a piston chamber (34) and a movable piston (28), wherein the volume of the piston chamber (34) can be varied by movement of the piston (28), wherein the piston chamber (34) is connected to the fluid supply (32) by the control chamber (36), and a one-way valve (20), which prevents a return of fluid from the piston chamber (34) into the fluid supply (32), is arranged between the piston chamber (34) and the control chamber (36).

2. The injection device (2) as claimed in claim 1, wherein the valve unit and the pump unit are arranged within a common sleeve body.

3. The injection device (2) as claimed in claim 1, wherein the control chamber (36) is delimited by an end of the valve needle (6) and the volume of the control chamber can be varied by movement of the valve needle (6).

4. The injection device (2) as claimed in claim 3, wherein the control chamber (36) is hydraulically connected to the fluid supply (32).

5. The injection device (2) as claimed in claim 1, wherein the piston (28) and the valve needle (6) are movable along a common axis.

6. The injection device (2) as claimed in claim 1, wherein the piston (28) can be moved by energization of a coil (30) of an electromagnet.

7. The injection device (2) as claimed in claim 1, wherein the piston (28) is movably supported by an elastic element (40).

8. The injection device (2) as claimed in claim 1, wherein the injection device is for injecting fluid into an exhaust tract of an internal combustion engine.

9. The injection device (2) as claimed in claim 2, wherein the control chamber (36) is delimited by an end of the valve needle (6) and the volume of the control chamber can be varied by movement of the valve needle (6).

10. The injection device (2) as claimed in claim 9, wherein the control chamber (36) is hydraulically connected to the fluid supply (32).

* * * * *